(12) United States Patent
Tanaka (10) Patent No.: US 12,462,349 B2
(45) Date of Patent: Nov. 4, 2025

(54) IMAGE PROCESSING DEVICE AND METHOD SUPPRESSING IMAGE SHARPNESS DECREASE WHILE REDUCING A TONE JUMP

(71) Applicant: Panasonic Intellectual Property Management Co., Ltd., Osaka (JP)

(72) Inventor: Teruto Tanaka, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 348 days.

(21) Appl. No.: 18/202,439

(22) Filed: May 26, 2023

(65) Prior Publication Data

US 2023/0298139 A1 Sep. 21, 2023

Related U.S. Application Data

(63) Continuation of application No. PCT/JP2021/042679, filed on Nov. 19, 2021.

(30) Foreign Application Priority Data

Nov. 27, 2020 (JP) .................. 2020-196904

(51) Int. Cl.
*G06T 5/70* (2024.01)
*G06T 5/20* (2006.01)
*G06T 7/00* (2017.01)

(52) U.S. Cl.
CPC ............ *G06T 5/70* (2024.01); *G06T 5/20* (2013.01); *G06T 7/0002* (2013.01); *G06T 2207/20024* (2013.01); *G06T 2207/30168* (2013.01)

(58) Field of Classification Search
CPC ..... G06T 5/00; G06T 5/20; G06T 5/70; G06T 7/00; G06T 7/0002; G06T 2207/20024;
(Continued)

(56) References Cited

U.S. PATENT DOCUMENTS 7,054,503 B2 * 5/2006 Ishikawa ............... H04N 19/86
375/E7.19
8,526,758 B2 * 9/2013 Uemura ................ G06V 10/30
358/3.26
(Continued)

FOREIGN PATENT DOCUMENTS

JP 2006-154452 6/2006
JP 2006-319634 11/2006
(Continued)

OTHER PUBLICATIONS

International Search Report issued Jan. 25, 2022 in International (PCT) Application No. PCT/JP2021/042679.

*Primary Examiner* — Scott A Rogers
(74) *Attorney, Agent, or Firm* — Wenderoth, Lind & Ponack, L.L.P.

(57) ABSTRACT

An image processing device includes: the determination unit that determines whether or not, among a plurality of pixels arranged linearly including a pixel of interest, a first adjacent pixel, and a second adjacent pixel, there is a pixel having a pixel value whose difference from a pixel value of the pixel of interest is greater than or equal to a reference value; a tone jump determination unit that determines whether or not a difference between an average value of pixel values of the first pixel group and an average value of pixel values of the second pixel group is less than or equal to a first threshold; and a correction unit that corrects atone jump of at least one pixel among the plurality of pixels.

14 Claims, 4 Drawing Sheets

(58) Field of Classification Search
CPC ...... G06T 2207/30168; H04N 1/00005; H04N 1/00034; H04N 1/40068; H04N 1/40093; H04N 1/407; H04N 1/4072; H04N 1/58; H04N 1/6027

See application file for complete search history.

(56) References Cited

U.S. PATENT DOCUMENTS

| | | | |
|---|---|---|---|
| 9,131,174 B2 * | 9/2015 | Yasuma | H04N 25/68 |
| 2006/0115173 A1 * | 6/2006 | Obara | G06T 5/50 |
| | | | 348/E5.064 |
| 2006/0268174 A1 | 11/2006 | Obara et al. | |
| 2008/0019600 A1 | 1/2008 | Takita et al. | |
| 2009/0245679 A1 * | 10/2009 | Ohwaki | G06T 5/20 |
| | | | 382/260 |

FOREIGN PATENT DOCUMENTS

| | | | | |
|---|---|---|---|---|
| JP | 2009194776 A | * | 8/2009 | ............ H04N 25/10 |
| JP | 4874184 | | 2/2012 | |
| JP | 2014-116698 | | 6/2014 | |
| JP | 2025085381 A | * | 6/2025 | |
| TW | I404408 B | * | 10/1997 | |

* cited by examiner

IMAGE PROCESSING DEVICE AND METHOD SUPPRESSING IMAGE SHARPNESS DECREASE WHILE REDUCING A TONE JUMP

TECHNICAL FIELD

The present disclosure relates to an image processing device and an image processing method.

BACKGROUND ART

A technique for reducing a tone jump caused in a gradation region in a display image due to coarse quantization of a video signal has been disclosed. For example, PTL 1 discloses a technique for making a tone jump less prominent by smoothing processing.

CITATION LIST

Patent Literature

PTL 1: Japanese Patent No. 4874184

SUMMARY OF THE INVENTION

However, the technique disclosed in PTL 1 has a problem that a portion that is not a tone jump is also smoothed, resulting in reduced sharpness of the portion that is not a tone jump.

The present disclosure provides an image processing device and the like that can suppress a decrease in sharpness of a portion that is not a tone jump while reducing a tone jump.

An image processing device according to the present disclosure includes: a determination unit that determines whether or not, among a plurality of pixels arranged linearly including a pixel of interest, a first adjacent pixel adjacent to the pixel of interest, and a second adjacent pixel adjacent to the pixel of interest and opposite to the first adjacent pixel, there is a pixel having a pixel value whose difference from a pixel value of the pixel of interest is greater than or equal to a reference value; a tone jump determination unit that, when the determination unit determines that there is no pixel having a pixel value whose difference from the pixel value of the pixel of interest is greater than or equal to the reference value, determines whether or not a difference between an average value of pixel values of a first pixel group including the first adjacent pixel among the plurality of pixels and an average value of pixel values of a second pixel group including the second adjacent pixel among the plurality of pixels is less than or equal to a first threshold; and a correction unit that, when the tone jump determination unit determines that the difference between the average value of pixel values of the first pixel group and the average value of pixel values of the second pixel group is less than or equal to the first threshold, corrects a tone jump of at least one pixel among the plurality of pixels.

An image processing method according to the present disclosure includes: determining whether or not, among a plurality of pixels arranged linearly including a pixel of interest, a first adjacent pixel adjacent to the pixel of interest, and a second adjacent pixel adjacent to the pixel of interest and opposite to the first adjacent pixel, there is a pixel having a pixel value whose difference from a pixel value of the pixel of interest is greater than or equal to a reference value; when it is determined that there is no pixel having a pixel value whose difference from the pixel value of the pixel of interest is greater than or equal to the reference value, determining whether or not a difference between an average value of pixel values of a first pixel group including the first adjacent pixel among the plurality of pixels and an average value of pixel values of a second pixel group including the second adjacent pixel among the plurality of pixels is less than or equal to a first threshold; and when it is determined that the difference between the average value of pixel values of the first pixel group and the average value of pixel values of the second pixel group is less than or equal to the first threshold, correcting a tone jump of at least one pixel among the plurality of pixels.

A program according to the present disclosure is for causing a computer to execute the above image processing method.

The image processing device and the like of the present disclosure can suppress a decrease in sharpness of a portion that is not a tone jump while reducing a tone jump.

DESCRIPTION OF EMBODIMENT

Exemplary embodiments will be described in detail below with reference to the drawings as appropriate. However, a detailed description more than necessary may be omitted. For example, the detailed description of already well-known matters and the overlap description of substantially the same configurations may not be described. This is to avoid an unnecessarily redundant description below and to facilitate understanding by those skilled in the art.

Note that, the inventor of the present disclosure provides the accompanying drawings and the following description in order to allow those skilled in the art to fully understand the present disclosure, and does not intend to limit the subject matter as described in the appended claims.

Exemplary Embodiment

An exemplary embodiment will be described below with reference to FIGS. 1 to 5.

Figure 1:
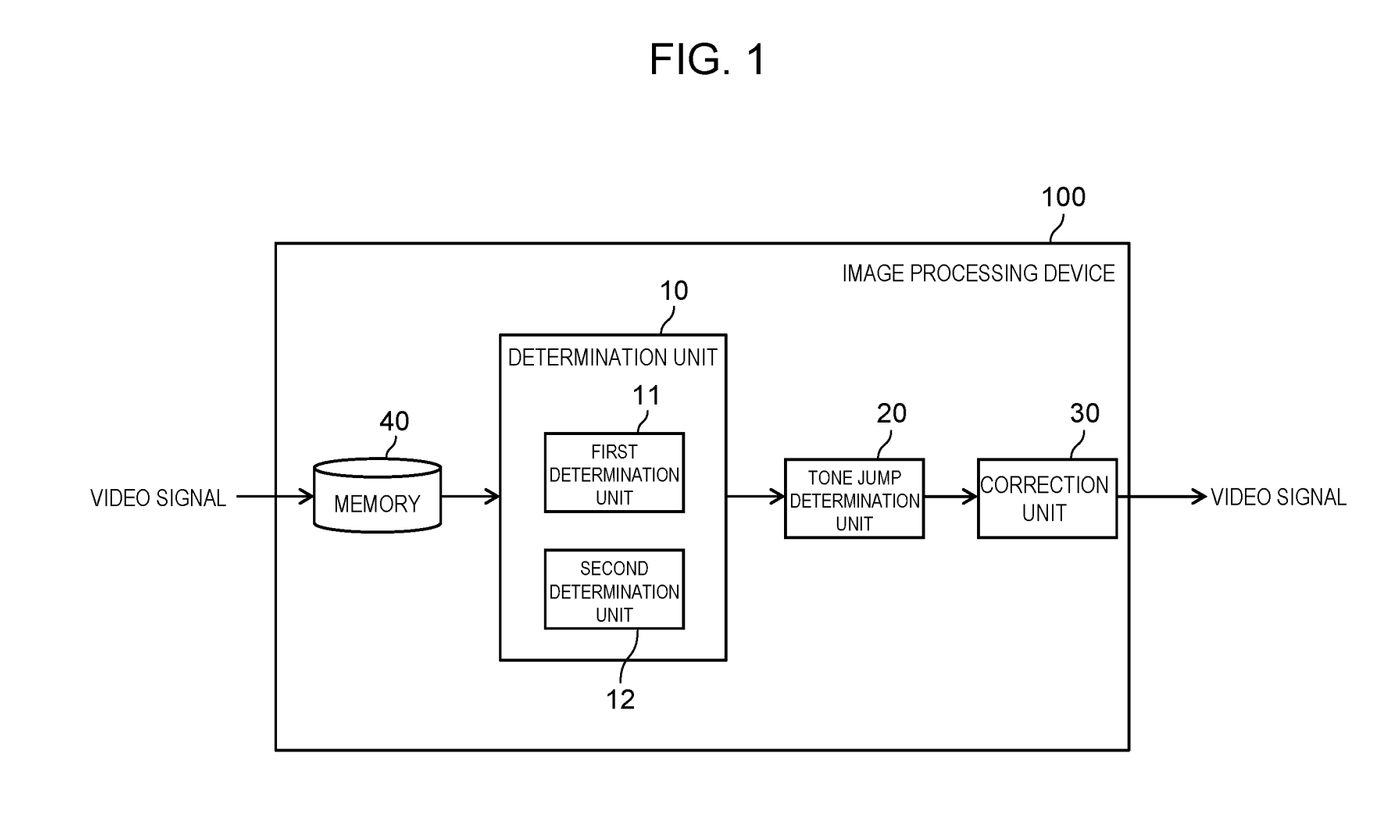
FIG. 1 is a diagram showing an example of the configuration of the image processing device according to an exemplary embodiment.

FIG. 1 is a diagram showing an example of the configuration of image processing device 100 according to an exemplary embodiment.

Image processing device 100 is a device to which a video signal (for example, an RGB signal) is input and which reduces a tone jump generated in a gradation region in a display image due to coarse quantization of the video signal. The tone jump is a contour line-like stripe pattern generated in the gradation region, and is also called banding, gradation jump, gradation step, or gradation skip.

Image processing device 100 is a computer having a processor, a memory, and the like. The memory is, for example, a read-only memory (ROM), a random access memory (RAM), or the like, and is capable of storing a program to be executed by the processor. Image processing device 100 includes determination unit 10, tone jump determination unit 20, correction unit 30, and memory 40. Determination unit 10, tone jump determination unit 20, and correction unit 30 are realized by a processor or the like that executes the program stored in the memory. Memory 40 may be either the same memory as the memory in which the program is stored, or a different memory.

Memory 40 is, for example, a line memory, and stores a pixel value (also referred to as a luminance value) of a pixel for each horizontal or vertical line of the video signal input to image processing device 100.

Determination unit 10 determines whether or not, among pixels within a predetermined range from a pixel of interest among a plurality of pixels arranged on a straight line including the pixel of interest, there is a pixel having a pixel value whose difference (specifically, an absolute value of the difference) from a pixel value of the pixel of interest is greater than or equal to a reference value. For example, determination unit 10 carries out the above determination with each of pixels aligned in the horizontal direction input to image processing device 100 as the pixel of interest, and then the above determination with each of pixels aligned in the vertical direction input to image processing device 100 as the pixel of interest. The above determination is carried out for each of R, G, and B. Determination unit 10 includes first determination unit 11 and second determination unit 12, and the determination of determination unit 10 is carried out by first determination unit 11 and second determination unit 12. First determination unit 11 and second determination unit 12 are described later in detail.

When it is determined that there is no pixel having a pixel value whose difference from the pixel value of the pixel of interest is greater than or equal to the reference value, tone jump determination unit 20 determines whether or not a difference (specifically, an absolute value of the difference) between the average pixel value of the first pixel group and the average pixel value of the second pixel group is less than or equal to the first threshold, for the first pixel group and the second pixel group adjacent to each other with the pixel of interest as a boundary among the plurality of pixels arranged on the straight line. Hereinafter, an example in which the first threshold is smaller than the reference value will be described, but the first threshold may be greater than or equal to the reference value. For example, tone jump determination unit 20 carries out the above determination with each of pixels aligned in the horizontal direction input to image processing device 100 as the pixel of interest, and then the above determination with each of pixels aligned in the vertical direction input to image processing device 100 as the pixel of interest. The above determination is carried out for each of R, G, and B. Tone jump determination unit 20 will be described later in detail.

When it is determined that the difference between the average pixel value of the first pixel group and the average pixel value of the second pixel group is less than or equal to the first threshold, correction unit 30 carries out correction processing of correcting a tone jump with respect to the plurality of pixels including the pixel of interest. Note that correcting the tone jump with respect to the plurality of pixels including the pixel of interest does not necessarily mean that all of the plurality of pixels are corrected, but means that at least one pixel included in the plurality of pixels can be corrected. For example, correction unit 30 carries out the above correction processing with each of pixels aligned in the horizontal direction input to image processing device 100 as the pixel of interest, and then the above correction processing with each of pixels aligned in the vertical direction input to image processing device 100 as the pixel of interest. The above correction processing is carried out for each of R, G, and B. Correction unit 30 will be described later in detail.

Next, an operation of image processing device 100 will be described with reference to FIG. 2.

Figure 2:
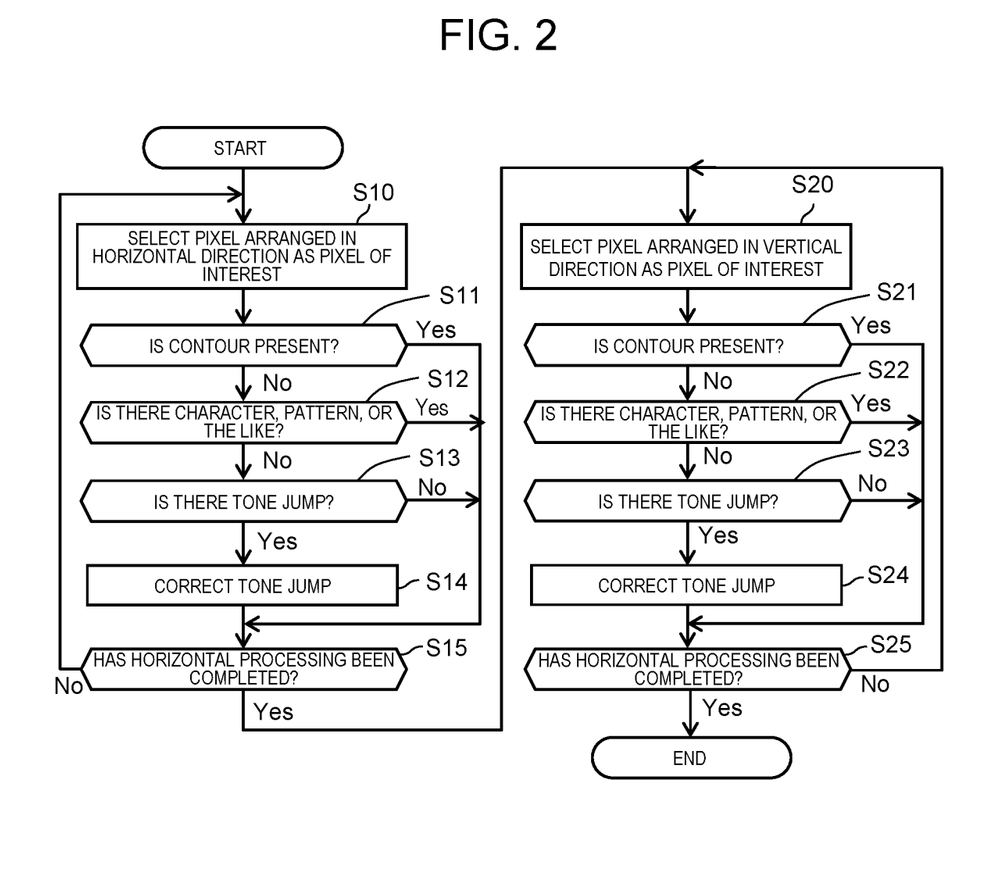
FIG. 2 is a flowchart showing an example of operation of the image processing device according to the exemplary embodiment.

FIG. 2 is a flowchart showing an example of operation of image processing device 100 according to the exemplary embodiment.

First, image processing device 100 selects a pixel arranged in the horizontal direction as the pixel of interest (step S10). For example, in a case where the resolution is 1920×1080, image processing device 100 selects one pixel from 1920 pixels arranged in the horizontal direction as the pixel of interest.

In steps S11 and S12, determination unit 10 determines whether or not, among pixels within a predetermined range from a pixel of interest among a plurality of pixels arranged on a straight line (pixels arranged in the horizontal direction) including the pixel of interest, there is a pixel having a pixel value whose difference from a pixel value of the pixel of interest is greater than or equal to a reference value, with first determination unit 11 and second determination unit 12. For example, pixels within a predetermined range from the pixel of interest include pixels adjacent to the pixel of interest in the plurality of pixels arranged on the straight line. The reference value includes a second threshold and a third threshold. Hereinafter, an example in which the third threshold is equal to the reference value and smaller than the second threshold will be described. That is, an example in which the second threshold is greater than the reference value will be described. However, the third threshold may be greater than or equal to the second threshold. The third threshold may be a value different from the reference value.

First determination unit 11 determines whether or not a contour is present around the selected pixel of interest (step S11). Specifically, first determination unit 11 determines whether or not, among pixels adjacent to the pixel of interest, there is a pixel having a pixel value whose difference from the pixel value of the pixel of interest is greater than or equal to the second threshold. The determination with respect to the pixels arranged in the horizontal direction by first determination unit 11 will be described with reference to FIG. 3.

Figure 3:
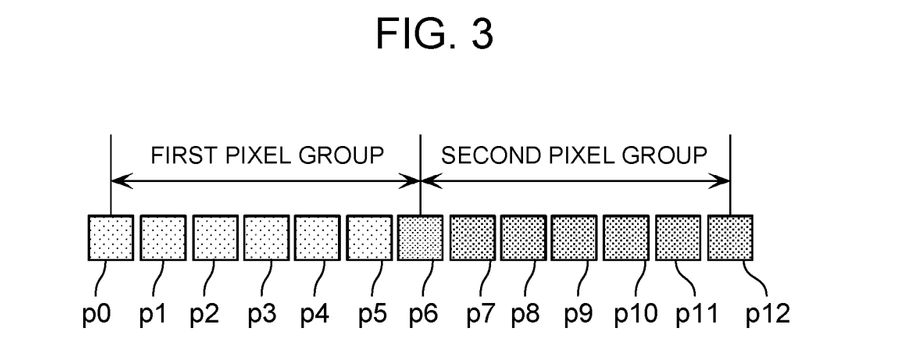
FIG. 3 is a diagram showing an example of pixels arranged in a horizontal direction.

FIG. 3 is a diagram showing an example of pixels arranged in a horizontal direction.

FIG. 3 illustrates pixels p0 to p12 in the plurality of pixels (pixels arranged in the horizontal direction) aligned on a straight line including the pixel of interest. For example, pixel p6 is a pixel of interest, and pixels p0 to p5 and pixels p7 to p12 are pixels within a predetermined range from pixel of interest p6. Here, the pixels within the predetermined range are pixels within a range of six pixels on the straight line from pixel of interest p6. Note that the pixel within the predetermined range from pixel of interest p6 may include at least a pixel adjacent to pixel of interest p6, and the size of the predetermined range is not particularly limited. As described above, the plurality of pixels p0 to p12 linearly arranged include pixel of interest p6, pixel p5 (an example of the first adjacent pixel) adjacent to pixel of interest p6, and pixel p7 (an example of the second adjacent pixel) adjacent to pixel of interest p6 and opposite to pixel p5.

First determination unit 11 determines whether or not, among pixels p5 and p7 adjacent to pixel of interest p6, there is a pixel having a pixel value whose difference from the pixel value of pixel of interest p6 is greater than or equal to the second threshold. The second threshold is a threshold for determining whether or not a difference in pixel value greater than the tone jump is generated (for example, a contour is present) in pixels p5 and p7 adjacent to pixel of interest p6. For example, a portion having a contour has a greater difference in pixel value than a portion having a tone jump, and thus the second threshold is greater than the first threshold for determining whether or not the tone jump is present.

When first determination unit 11 determines that there is a contour around the selected pixel of interest (Yes in step S11), the processing in steps S13 and S14 is not carried out.

When first determination unit 11 determines that there is no contour around the selected pixel of interest (No in step S11), second determination unit 12 determines whether or not there is a character, a pattern, or the like around the selected pixel of interest (step S12). Specifically, second determination unit 12 determines whether or not, among pixels in the predetermined range, there is a pixel having a pixel value whose difference from the pixel value of the pixel of interest is greater than or equal to the third threshold. The determination with respect to the pixels arranged in the horizontal direction by second determination unit 12 will be described with reference to FIG. 3.

Second determination unit 12 determines whether or not, among pixels p0 to p5 and p7 to p12 within the predetermined range from pixel of interest p6, there is a pixel having a pixel value whose difference from the pixel value of pixel of interest p6 is greater than or equal to the third threshold. The third threshold is a threshold for determining whether or not a difference in pixel value greater than the tone jump is generated (for example, a character, a pattern, or the like is present) in pixels p0 to p5 and p7 to p12 within the predetermined range from pixel of interest p6. For example, a portion having a character, a pattern, or the like has a greater difference in pixel value than a portion having a tone jump, and thus the third threshold is greater than the first threshold for determining whether or not the tone jump is present. In addition, since a difference in pixel value is not caused in a portion having a character, a pattern, or the like as much as in a portion having a contour, the third threshold is smaller than the second threshold.

When second determination unit 12 determines that there is a character, a pattern, or the like around the selected pixel of interest (Yes in step S12), the processing in steps S13 and S14 is not carried out.

Note that the processing in steps S11 and S12 may be carried out in the order of steps S12 and S11. That is, second determination unit 12 carries out the determination, and when second determination unit 12 determines that there is no character or pattern around the selected pixel of interest, first determination unit 11 may determine whether or not there is a contour around the selected pixel of interest.

When first determination unit 11 and second determination unit 12 determine that there is no contour around the selected pixel of interest and that there is no character, pattern, or the like (No in step S11 and No in step S12), tone jump determination unit 20 determines whether there is a tone jump (step S13). Specifically, when first determination unit 11 and second determination unit 12 determine that, among the pixels adjacent to the pixel of interest, there is no pixel having a pixel value whose difference from the pixel value of the pixel of interest is greater than or equal to the second threshold and that there is no pixel having a pixel value whose difference from the pixel value of the pixel of interest is greater than or equal to the third threshold, tone jump determination unit 20 determines whether or not a difference between the average pixel value of the first pixel group and the average pixel value of the second pixel group is less than or equal to the first threshold. The determination with respect to the pixels arranged in the horizontal direction by tone jump determination unit 20 will be described with reference to FIG. 3.

For example, the first pixel group includes pixels p0 to p6, and the second pixel group includes pixels p6 to p12. As shown in FIG. 3, it can be seen that the first pixel group and the second pixel group are adjacent to each other with pixel of interest p6 as a boundary. Note that the first pixel group may not include pixel of interest p6, and the second pixel group may not include pixel of interest p6. Note that the first pixel group is only required to include adjacent pixel groups including at least a pixel (here, pixel p5) adjacent to pixel of interest p6, and the second pixel group is only required to include adjacent pixel groups including at least a pixel (here, pixel p7) adjacent to pixel of interest p6, and the number of pixels included in the first pixel group and the second pixel group is not limited. As described above, the first pixel group includes pixel p5 among the plurality of pixels p0 to p12. The second pixel group includes pixel p7 among the plurality of pixels p0 to p12. That is, the first pixel group may include pixels p0 to p6, and the second pixel group may include pixels p7 to p12. In addition, the first pixel group may include pixels p0 to p5, and the second pixel group may include pixels p6 to p12.

Tone jump determination unit 20 determines whether or not the difference between the average pixel value of pixels p0 to p6 of the first pixel group (the average value of the pixel values of pixels p0 to p6) and the average pixel value of pixels p6 to p12 of the second pixel group (the average value of the pixel values of pixels p6 to p12) is less than or equal to the first threshold. Specifically, tone jump determination unit 20 determines whether or not a difference between the average pixel value of pixels p0 to p6 in the first pixel group and the average pixel value of pixels p6 to p12 in the second pixel group is less than or equal to the first threshold and greater than or equal to the fourth threshold. The fourth threshold is a threshold less than the first threshold and greater than 0. That is, tone jump determination unit 20 determines whether or not the difference is greater than or equal to the fourth threshold and less than or equal to the first threshold. The first threshold and the fourth threshold are thresholds for determining whether or not there is a tone jump in pixels p0 to p12. The tone jump is generated in the gradation region, and it is possible to determine whether or not there is the tone jump by comparing an average value of pixel values gradually changing in the first pixel group with an average value of pixel values gradually changing in the second pixel group. For example, in a portion with a tone jump, a difference in pixel value does not occur as much as in a portion with a contour or a portion with a character, a pattern, or the like. Therefore, the first threshold is smaller than a reference value (specifically, the second threshold and the third threshold) for determining whether or not there is a contour, a character, a pattern, or the like.

If tone jump determination unit 20 determines that there is no tone jump (No in step S13), that is, if tone jump determination unit 20 determines that the difference between the average pixel value of the first pixel group and the average pixel value of the second pixel group is neither greater than or equal to the fourth threshold nor less than or equal to the first threshold, the processing in step S14 is not carried out. For example, in a case where the difference is larger than the first threshold, there is a possibility that there is a light outline, character, pattern, or the like that could not be detected in step S11 or step S12, and thus the processing in step S14 is not carried out. Furthermore, for example, in a case where the difference is less than the fourth threshold, a minute tone jump is not generated, and thus, the processing in step S14 is not carried out.

If tone jump determination unit 20 determines that there is a tone jump (Yes in step S13), that is, if tone jump determination unit 20 determines that the difference between the average pixel value of the first pixel group and the average pixel value of the second pixel group is greater than or equal to the fourth threshold and less than or equal to the first threshold, correction unit 30 carries out correction processing of correcting a tone jump with respect to the plurality of pixels including the pixel of interest (step S14). For example, the correction processing of correction unit 30 is processing of smoothing the tone jump.

For example, correction unit 30 may smooth the tone jump by performing low-pass filter processing. As the low-pass filter processing, a method of using a one-dimensional N-tap filter is exemplified.

Note that the correction processing by correction unit 30 may not be the processing of smoothing the tone jump. For example, correction unit 30 may correct the tone jump by adding noise (for example, dither processing).

Furthermore, even when the difference between the average pixel value of the first pixel group and the average pixel value of the second pixel group is less than the fourth threshold (for example, 0), correction unit 30 may perform the correction processing of correcting the tone jump.

Next, image processing device 100 determines whether or not horizontal processing has been completed (step S15). For example, in a case where all the pixels arranged in the horizontal direction are selected as the pixels of interest and each processing from step S11 is carried out, image processing device 100 determines that the horizontal processing has been completed. In a case where the horizontal processing has not been completed (No in step S15), in step S10, image processing device 100 selects one pixel that has not yet been selected from among the pixels arranged in the horizontal direction as a pixel of interest, and performs each processing from step S11 with respect to the pixel of interest. Note that image processing device 100 may determine that the horizontal processing has been completed in a case where all the pixels arranged in the horizontal direction for one row are selected as the pixels of interest and each processing is carried out, or may determine that the horizontal processing has been completed in a case where all the pixels arranged in the horizontal direction for a plurality of rows (for example, all the rows) are selected as the pixels of interest and each processing is carried out.

When the horizontal processing has been completed (Yes in step S15), image processing device 100 selects a pixel arranged in the vertical direction as a pixel of interest (step S20). For example, in a case where the resolution is 1920× 1080, image processing device 100 selects one pixel from 1080 pixels arranged in the vertical direction as the pixel of interest.

In steps S21 and S22, determination unit 10 determines whether or not, among pixels within a predetermined range from a pixel of interest among a plurality of pixels arranged on a straight line (pixels arranged in the vertical direction) including the pixel of interest, there is a pixel having a pixel value whose difference from a pixel value of the pixel of interest is greater than or equal to a reference value, with first determination unit 11 and second determination unit 12.

First determination unit 11 determines whether or not a contour is present around the selected pixel of interest (step S21). Specifically, first determination unit 11 determines whether or not, among pixels adjacent to the pixel of interest, there is a pixel having a pixel value whose difference from the pixel value of the pixel of interest is greater than or equal to the second threshold. The determination with respect to the pixels arranged in the vertical direction by first determination unit 11 will be described with reference to FIG. 4.

Figure 4:
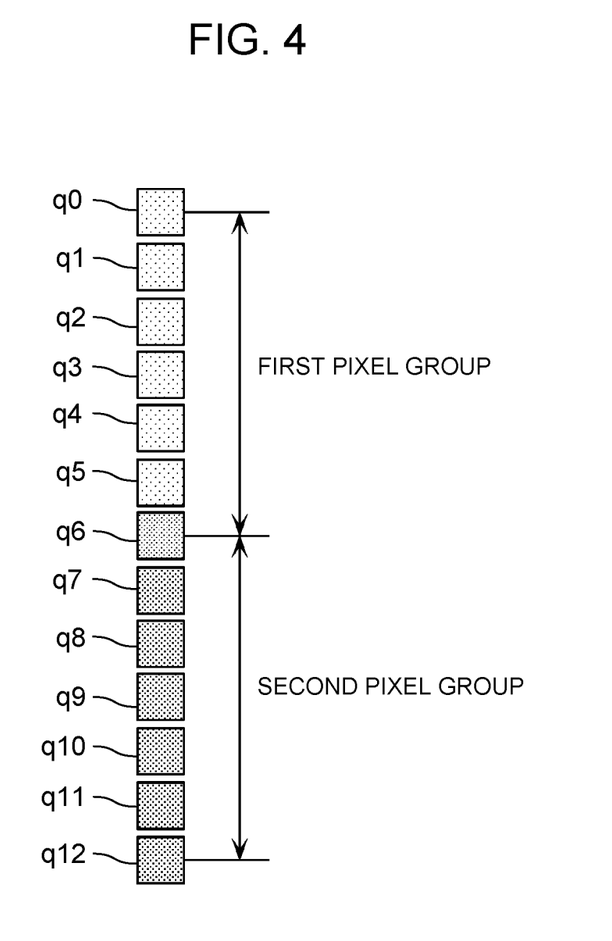
FIG. 4 is a diagram showing an example of pixels arranged in a vertical direction.

FIG. 4 is a diagram showing an example of pixels arranged in a vertical direction.

FIG. 4 illustrates pixels q0 to q12 in the plurality of pixels (pixels arranged in the vertical direction) aligned on a straight line including the pixel of interest. For example, pixel q6 is a pixel of interest, and pixels q0 to q5 and pixels q7 to q12 are pixels within a predetermined range from pixel of interest q6. First determination unit 11 determines whether or not, among pixels q5 and q7 adjacent to pixel of interest q6, there is a pixel having a pixel value whose difference from the pixel value of pixel of interest q6 is greater than or equal to the second threshold.

When first determination unit 11 determines that there is a contour around the selected pixel of interest (Yes in step S21), the processing in steps S23 and S24 is not carried out.

When first determination unit 11 determines that there is no contour around the selected pixel of interest (No in step S21), second determination unit 12 determines whether or not there is a character, a pattern, or the like around the selected pixel of interest (step S22). Specifically, second determination unit 12 determines whether or not, among pixels in the predetermined range, there is a pixel having a pixel value whose difference from the pixel value of the pixel of interest is greater than or equal to the third threshold. The determination with respect to the pixels arranged in the vertical direction by second determination unit 12 will be described with reference to FIG. 4.

Second determination unit 12 determines whether or not, among pixels q0 to q5 and q7 to q12 within the predetermined range from pixel of interest q6, there is a pixel having a pixel value whose difference from the pixel value of pixel of interest q6 is greater than or equal to the third threshold.

When second determination unit 12 determines that there is a character, a pattern, or the like around the selected pixel of interest (Yes in step S22), the processing in steps S23 and S24 is not carried out.

Note that the processing in steps S21 and S22 may be carried out in the order of steps S22 and S21.

When first determination unit 11 and second determination unit 12 determine that there is no contour around the selected pixel of interest and that there is no character, pattern, or the like (No in step S21 and No in step S22), tone jump determination unit 20 determines whether there is a tone jump (step S23). Specifically, when first determination unit 11 and second determination unit 12 determine that, among the pixels adjacent to the pixel of interest, there is no pixel having a pixel value whose difference from the pixel value of the pixel of interest is greater than or equal to the second threshold and that there is no pixel having a pixel value whose difference from the pixel value of the pixel of interest is greater than or equal to the third threshold, tone jump determination unit 20 determines whether or not a difference between the average pixel value of the first pixel group and the average pixel value of the second pixel group is less than or equal to the first threshold. The determination with respect to the pixels arranged in the vertical direction by tone jump determination unit 20 will be described with reference to FIG. 4.

For example, the first pixel group includes pixels q0 to q6, and the second pixel group includes pixels q6 to q12. As shown in FIG. 4, it can be seen that the first pixel group and the second pixel group are adjacent to each other with pixel of interest q6 as a boundary. Note that the first pixel group may not include pixel of interest q6, and the second pixel group may not include pixel of interest q6. Note that the first pixel group is only required to include adjacent pixel groups including at least a pixel (here, pixel q5) adjacent to pixel of interest q6, and the second pixel group is only required to include adjacent pixel groups including at least a pixel (here, pixel q7) adjacent to pixel of interest q6, and the number of pixels included in the first pixel group and the second pixel group is not limited. Tone jump determination unit 20 determines whether or not the difference between the average pixel value of pixels q0 to q6 in the first pixel group and the average pixel value of pixels q6 to q12 in the second pixel group is less than or equal to the first threshold. Specifically, tone jump determination unit 20 determines whether or not the difference between the average pixel value of pixels q0 to q6 in the first pixel group and the average pixel value of pixels q6 to q12 in the second pixel group is less than or equal to the first threshold and greater than or equal to the fourth threshold.

If tone jump determination unit 20 determines that there is no tone jump (No in step S23), that is, if tone jump determination unit 20 determines that the difference between the average pixel value of the first pixel group and the average pixel value of the second pixel group is neither greater than or equal to the fourth threshold nor less than or equal to the first threshold, the processing in step S24 is not carried out.

If tone jump determination unit 20 determines that there is a tone jump (Yes in step S23), that is, if tone jump determination unit 20 determines that the difference between the average pixel value of the first pixel group and the average pixel value of the second pixel group is greater than or equal to the fourth threshold and less than or equal to the first threshold, correction unit 30 carries out correction processing of correcting a tone jump (step S24).

Next, image processing device 100 determines whether or not vertical processing has been completed (step S25). For example, in a case where all the pixels arranged in the vertical direction are selected as the pixels of interest and each processing from step S21 is carried out, image processing device 100 determines that the vertical processing has been completed. In a case where the vertical processing has not been completed (No in step S25), in step S20, image processing device 100 selects one pixel that has not yet been selected from among the pixels arranged in the vertical direction as a pixel of interest, and performs each processing from step S21 with respect to the pixel of interest. Note that image processing device 100 may determine that the vertical processing has been completed in a case where all the pixels arranged in the vertical direction for one column are selected as the pixels of interest and each processing is carried out, or may determine that the vertical processing has been completed in a case where all the pixels arranged in the vertical direction for a plurality of columns (for example, all the columns) are selected as the pixels of interest and each processing is carried out.

Note that, although an example has been described in which memory 40 is, for example, a line memory and stores the pixel values of pixels for each horizontal or vertical line of the video signal input to image processing device 100, memory 40 may also be a frame memory or may store a frame. In this case, as illustrated in FIG. 5, a plurality of pixels arranged on a straight line including the pixel of interest may be pixels arranged in an oblique direction (for example, a direction forming an angle of 45 degrees with the horizontal direction or the vertical direction).

Figure 5:
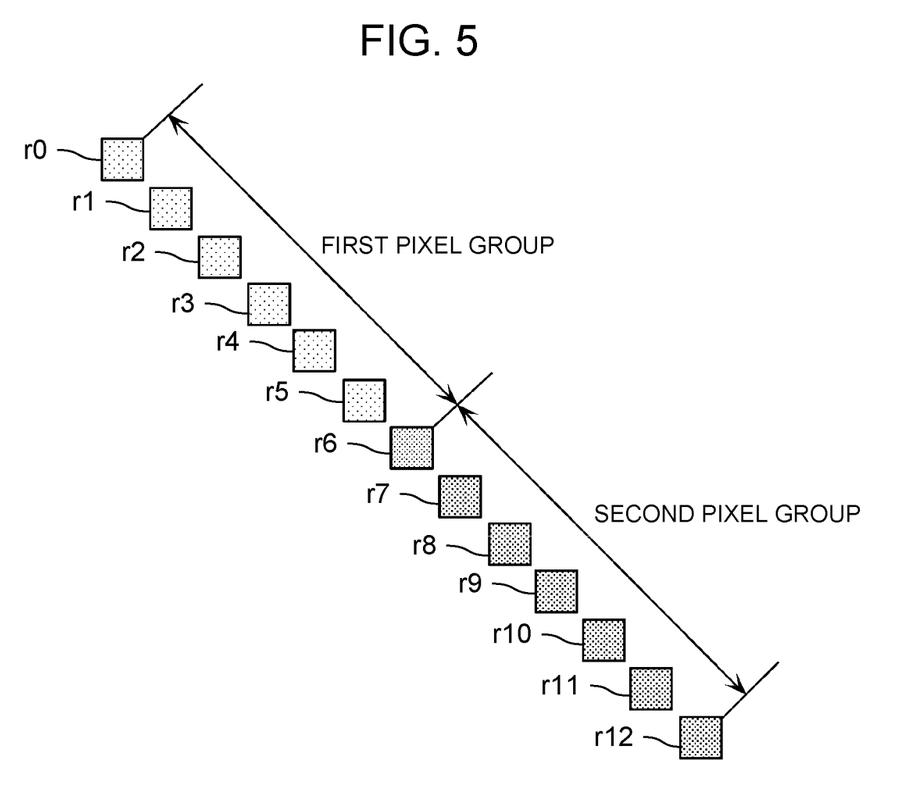
FIG. 5 is a diagram showing an example of pixels arranged in a diagonal direction.

FIG. 5 is a diagram showing an example of pixels arranged in a diagonal direction.

In this case, first determination unit 11 determines whether or not, among pixels r5 and r7 adjacent to pixel of interest r6, there is a pixel having a pixel value whose difference from the pixel value of pixel of interest r6 is greater than or equal to the second threshold. Furthermore, second determination unit 12 determines whether or not, among pixels r0 to r5 and r7 to r12 within the predetermined range from pixel of interest r6, there is a pixel having a pixel value whose difference from the pixel value of pixel of interest r6 is greater than or equal to the third threshold. In addition, tone jump determination unit 20 determines whether or not the difference between the average pixel value of pixels r0 to r6 in the first pixel group and the average pixel value of pixels r6 to r12 in the second pixel group is less than or equal to the first threshold.

Although the example in which determination unit 10 includes both first determination unit 11 and second determination unit 12 has been described, determination unit 10 may include only one of them. In a case where determination unit 10 includes only first determination unit 11, it may be determined whether or not a contour is present, and in a case where the contour is not present, it may be determined whether or not a tone jump is present. Alternatively, in a case where determination unit 10 includes only second determination unit 12, it may be determined whether or not a character, a pattern or the like is present, and in a case where a character, a pattern or the like is not present, it may be determined whether or not a tone jump is present.

In addition, the pixel range used for determining whether or not a contour is present, the pixel range used for determining whether or not a character, a pattern, or the like is present, and the ranges of the first pixel group and the second pixel group used for determining whether or not a tone jump is present may be the same or different.

Furthermore, correction unit 30 may perform correction processing only on the pixel of interest, or may perform correction processing on a pixel used for determining whether or not a contour is present or a pixel used for determining whether or not a character, a pattern, or the like is present.

As described above, image processing device 100 includes: determination unit 10 that determines whether or not, among pixels within a predetermined range from a pixel of interest among a plurality of pixels arranged on a straight line including the pixel of interest, there is a pixel having a pixel value whose difference from a pixel value of the pixel of interest is greater than or equal to a reference value, tone jump determination unit 20 that, when it is determined that there is no pixel having a pixel value whose difference from the pixel value of the pixel of interest is greater than or equal to the reference value, determines whether or not a difference between the average pixel value of the first pixel group and the average pixel value of the second pixel group is less than or equal to the first threshold, for the first pixel group and the second pixel group adjacent to each other with the pixel of interest as a boundary among the plurality of pixels arranged on the straight line, and correction unit 30 that, when it is determined that the difference between the average pixel value of the first pixel group and the average pixel value of the second pixel group is less than or equal to the first threshold, carries out correction processing of correcting a tone jump.

The reference value is a threshold for determining whether or not, for example, a contour, a character, a pattern, or the like is present within a predetermined range from the pixel of interest. According to the present disclosure, prior to the determination as to whether or not the difference between the average pixel value of the first pixel group and the average pixel value of the second pixel group is less than or equal to the first threshold (that is, determination as to whether or not there is a tone jump) is made, the determination as to whether or not a pixel having a pixel value whose difference from the pixel value of the pixel of interest is greater than or equal to the reference value is present (that is, determination as to whether or not a contour, a character, a pattern, or the like is present) is made for pixels within a predetermined range from the pixel of interest. When a contour, a character, a pattern, or the like is not present, it is determined whether or not there is a tone jump, and when there is a tone jump, correction processing of correcting the tone jump is carried out. When there is a contour, a character, a pattern, or the like, it is not determined whether or not there is a tone jump, and the correction process for correcting the tone jump is not carried out. Therefore, it is possible to suppress a decrease in sharpness of a portion that is not a tone jump (for example, a contour, a character, a pattern, or the like in an image). A decrease in sharpness of a portion that is not a tone jump can thus be suppressed while a tone jump is reduced.

For example, determination unit 10 may include first determination unit 11, pixels within a predetermined range from the pixel of interest may include a pixel adjacent to the pixel of interest in a plurality of pixels arranged on a straight line, and first determination unit 11 may determine whether or not there is a pixel having a pixel value whose difference from a pixel value of the pixel of interest is greater than or equal to a reference value among the pixels adjacent to the pixel of interest.

The reference value is, for example, a threshold for determining whether or not a contour is present. According to the present exemplary embodiment, before the determination as to whether or not the difference between the average pixel value of the first pixel group and the average pixel value of the second pixel group is less than or equal to the first threshold (that is, determination as to whether or not there is a tone jump) is made, the determination as to whether or not a pixel having a pixel value whose difference from the pixel value of the pixel of interest is greater than or equal to the reference value is present (that is, determination as to whether or not a contour is present) is made for the pixels adjacent to the pixel of interest. When a contour is not present, it is determined whether or not there is a tone jump, and when there is a tone jump, correction processing of correcting the tone jump is carried out. When there is a contour, it is not determined whether or not there is a tone jump, and the correction process for correcting the tone jump is not carried out. Therefore, it is possible to suppress a decrease in sharpness of a portion that is not a tone jump (for example, a contour).

For example, determination unit 10 may include first determination unit 11 and second determination unit 12, the pixel within the predetermined range from the pixel of interest may include the pixel adjacent to the pixel of interest in the plurality of pixels arranged on the straight line, and the reference value may include the second threshold and the third threshold. First determination unit 11 may determine whether or not there is a pixel having a pixel value whose difference from the pixel value of the pixel of interest is greater than or equal to the second threshold among the pixels adjacent to the pixel of interest, and second determination unit 12 may determine whether or not there is a pixel having a pixel value whose difference from the pixel value of the pixel of interest is greater than or equal to the third threshold among the pixels within the predetermined range. When it is determined that, among the pixels adjacent to the pixel of interest, there is no pixel having a pixel value whose difference from the pixel value of the pixel of interest is greater than or equal to the second threshold and that there is no pixel having a pixel value whose difference from the pixel value of the pixel of interest is greater than or equal to the third threshold, tone jump determination unit 20 may determine whether or not a difference between the average pixel value of the first pixel group and the average pixel value of the second pixel group is less than or equal to the first threshold.

The second threshold is a threshold for determining whether or not a difference in pixel value greater than or equal to the tone jump is generated (for example, a contour is present) in the pixels adjacent to the pixel of interest. The third threshold is a threshold for determining whether or not a difference in pixel value greater than or equal to the tone jump is generated (for example, a character, a pattern, or the like is present) in the pixels within the predetermined range from the pixel of interest. For example, a portion having a contour, a character, a pattern, or the like has a larger difference in pixel value than a portion having a tone jump, and thus the second threshold and the third threshold are larger than the first threshold. In addition, since a difference in pixel value is not caused in a portion having a character, a pattern, or the like as much as in a portion having a contour, the third threshold is smaller than the second threshold. According to the present exemplary embodiment, before the determination as to whether or not the difference between the average pixel value of the first pixel group and the average pixel value of the second pixel group is less than or equal to the first threshold (that is, determination as to whether or not there is a tone jump) is made, the determination as to whether or not a pixel having a pixel value whose difference from the pixel value of the pixel of interest is greater than or equal to the second threshold is present (that is, determination as to whether or not a contour is present) is made for pixels adjacent to the pixel of interest, and the determination as to whether or not a pixel having a pixel value whose difference from the pixel value of the pixel of interest is greater than or equal to the third threshold is present (that is, determination as to whether or not a character, a pattern, or the like is present) is made for pixels within a predetermined range from the pixel of interest. When a contour is not present and a character, a pattern, or the like is not present, it is determined whether or not there is a tone jump, and when there is a tone jump, correction processing of correcting the tone jump is carried out. When there is a contour, a character, a pattern, or the like, it is not determined whether or not there is a tone jump, and the correction process for correcting the tone jump is not carried out. Therefore, it is possible to suppress a decrease in sharpness of a portion that is not a tone jump (for example, a contour, a character, a pattern, or the like).

For example, tone jump determination unit 20 may determine whether or not a difference between the average pixel value of the first pixel group and the average pixel value of the second pixel group is less than or equal to the first threshold and greater than or equal to the fourth threshold that is less than the first threshold and greater than 0.

As a result, when the difference between the average pixel value of the first pixel group and the average pixel value of the second pixel group is greater than or equal to 0 and less than the fourth threshold, it is possible not to carry out the correction processing of correcting the tone jump.

For example, image processing device 100 carries out determination by determination unit 10, determination by tone jump determination unit 20, and the correction processing by correction unit 30, with each of the pixels (plurality of horizontal input pixels) arranged in the horizontal direction included in the video signal input to image processing device 100, as the pixel of interest. Furthermore, image processing device 100 may carry out determination by determination unit 10, determination by tone jump determination unit 20, and the correction processing by correction unit 30, with each of the pixels (plurality of vertical input pixels) arranged in the vertical direction included in the video signal input to image processing device 100, as the pixel of interest.

As a result, the horizontal and vertical processing can be performed by using several line memories or the like instead of using the frame memory. Therefore, the processing time with lower latency as compared with the processing using the frame memory is enabled, and the cost reduction is enabled by not using the frame memory.

For example, the correction processing of correction unit 30 may be processing of smoothing the tone jump.

For example, as the correction processing for correcting the tone jump, there are a method of making the tone jump less prominent by noise addition, a method of making the tone jump less prominent by smoothing processing, and the like. However, noise addition has a problem of image quality degradation due to noise. Therefore, by performing the smoothing processing as the correction processing for correcting the tone jump, it is possible to suppress deterioration of image quality due to noise.

Other Exemplary Embodiments

As described above, the exemplary embodiment has been described as an example of the technique disclosed in the present application. However, the technique according to the present disclosure is not limited to the exemplary embodiments, and is also applicable to any exemplary embodiment achieved through appropriate changes, replacements, additions, omissions, or the like. Alternatively, the components described in the above exemplary embodiments may be combined to make an additional exemplary embodiment.

For example, in the above exemplary embodiments, the video signal is an RGB signal. However, the video signal may be a YUV signal, a YPbPr signal, or an HSV signal.

For example, the present disclosure can be realized not only as image processing device 100 but also as an image processing method including steps (processing) performed by components constituting image processing device 100.

Figure 6:
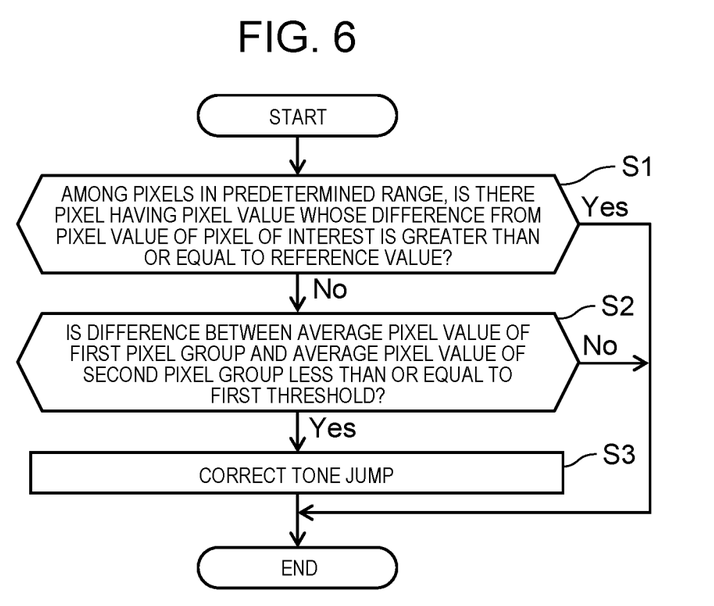
FIG. 6 is a flowchart showing an example of an image processing method according to another exemplary embodiment.

FIG. 6 is a flowchart showing an example of an image processing method according to another exemplary embodiment.

Specifically, as shown in FIG. 6, the image processing method includes processing of: determining whether or not, among pixels within a predetermined range from a pixel of interest among a plurality of pixels arranged on a straight line including the pixel of interest, there is a pixel having a pixel value whose difference from a pixel value of the pixel of interest is greater than or equal to a reference value (step S1); determining, when it is determined that there is no pixel having a pixel value whose difference from the pixel value of the pixel of interest is greater than or equal to the reference value, whether or not a difference between the average pixel value of the first pixel group and the average pixel value of the second pixel group is less than or equal to the first threshold, for the first pixel group and the second pixel group adjacent to each other with the pixel of interest as a boundary among the plurality of pixels arranged on the straight line (step S2); and carrying out correction processing of correcting a tone jump when it is determined that the difference between the average pixel value of the first pixel group and the average pixel value of the second pixel group is less than or equal to the first threshold (step S3).

For example, the image processing method may be executed by a computer (a computer system). The present disclosure may be implemented in the form of a program that causes a computer to execute the steps included in the image processing method. Also, the present disclosure may be implemented as a non-transitory computer-readable recording medium, such as a compact disc read-only memory (CD-ROM) storing the program.

For example, in a case where the present disclosure is achieved by a computer program (software), respective steps are executed by executing the program through the use of hardware resources, such as a central processing unit (CPU), memory, and input-output circuits on the computer. In other words, the computer performs the respective steps by letting the CPU acquire data from the memory, the input-output circuits, or other units, carry out computations, and output computation results to the memory, the input-output circuits, or the other units.

In addition, the constitutive elements included in image processing device 100 according to the above exemplary embodiment may be implemented using a large-scale integration (LSI) that is one of integrated circuits (ICs).

The integrated circuit is not limited to the LSI. The integrated circuit also may be implemented using a dedicated circuit or a general purpose processor. A programmable FPGA or a reconfigurable processor that allows reconfiguration of circuit cell connections and settings inside an LSI may be used.

If progress of semiconductor technology or other technologies that derive from semiconductor technology result in emergence of a circuit integration technology that replaces the LSI, circuit integration of the constitutive elements included in image processing device 100 may be naturally implemented using the new technology.

As described above, the exemplary embodiments have been described to exemplify the techniques in the present disclosure. The accompanying drawings and the detailed description have been presented for this purpose.

Accordingly, the components described in the attached drawings and the detailed descriptions include not only components essential for solving the problem, but also components that are not essential for solving the problem. For this reason, it should not be immediately construed that those non-essential components are essential only based on the fact that those non-essential components are illustrated in the accompanying drawings or described in the detailed description.

Since the above described exemplary embodiments are intended to exemplify the technique according to the present disclosure, various modifications, replacements, additions, and omissions can be made within the scope of the appended claims or of their equivalents.

INDUSTRIAL APPLICABILITY

The present disclosure can be applied to an image processing device or the like that reduces a tone jump caused in a gradation region in a display image due to coarse quantization of a video signal.

REFERENCE MARKS IN THE DRAWINGS 10 determination unit
11 first determination unit
12 second determination unit
20 tone jump determination unit
30 correction unit
40 memory
100 image processing device

The invention claimed is:

1. An image processing device comprising:
a determination unit that determines whether or not, among a plurality of pixels arranged linearly including a pixel of interest, a first adjacent pixel adjacent to the pixel of interest, and a second adjacent pixel adjacent to the pixel of interest and opposite to the first adjacent pixel, there is a pixel having a pixel value whose difference from a pixel value of the pixel of interest is greater than or equal to a reference value;
a tone jump determination unit that, when the determination unit determines that there is no pixel having a pixel value whose difference from the pixel value of the pixel of interest is greater than or equal to the reference value, determines whether or not a difference between (i) an average value of pixel values of a first pixel group including the first adjacent pixel among the plurality of pixels and (ii) an average value of pixel values of a second pixel group including the second adjacent pixel among the plurality of pixels is less than or equal to a first threshold; and
a correction unit that, when the tone jump determination unit determines that the difference between (i) the average value of pixel values of the first pixel group and (ii) the average value of pixel values of the second pixel group is less than or equal to the first threshold, corrects a tone jump of at least one pixel among the plurality of pixels.

2. The image processing device according to claim 1, wherein
the determination unit includes a first determination unit,
the first determination unit determines whether or not, among the first adjacent pixel and the second adjacent pixel, there is a pixel having a pixel value whose difference from the pixel value of the pixel of interest is greater than or equal to the reference value, and
when the first determination unit determines that there is no pixel having a pixel value whose difference from the pixel value of the pixel of interest is greater than or equal to the reference value, the tone jump determination unit determines whether or not the difference between (i) the average value of pixel values of the first pixel group and (ii) the average value of pixel values of the second pixel group is less than or equal to the first threshold.

3. The image processing device according to claim 1, wherein
the determination unit includes a first determination unit and a second determination unit,
the first determination unit determines whether or not, among the first adjacent pixel and the second adjacent pixel, there is a pixel having a pixel value whose difference from the pixel value of the pixel of interest is greater than or equal to a second threshold,
the second determination unit determines whether or not, among the plurality of pixels, there is a pixel having a pixel value whose difference from the pixel value of the pixel of interest is greater than or equal to a third threshold, and
when the first determination unit determines that there is no pixel having a pixel value whose difference from the pixel value of the pixel of interest is greater than or equal to the second threshold and the second determination unit determines that there is no pixel having a pixel value whose difference from the pixel value of the pixel of interest is greater than or equal to the third threshold, the tone jump determination unit determines whether or not the difference between (i) the average value of pixel values of the first pixel group and (ii) the average value of pixel values of the second pixel group is less than or equal to the first threshold.

4. The image processing device according to claim 3, wherein the second threshold is greater than the reference value, and the third threshold is equal to the reference value.

5. The image processing device according to claim 1, wherein
the tone jump determination unit determines whether or not the difference between (i) the average value of pixel values of the first pixel group and (ii) the average value of pixel values of the second pixel group is less than or equal to the first threshold and greater than or equal to a fourth threshold that is less than the first threshold and greater than 0, and
when the tone jump determination unit determines that the difference between (i) the average value of pixel values of the first pixel group and (ii) the average value of pixel values of the second pixel group is less than or equal to the first threshold and greater than or equal to the fourth threshold, the correction unit corrects the tone jump of the at least one pixel among the plurality of pixels.

6. The image processing device according to claim 1, wherein
the image processing device
carries out determination by the determination unit, determination by the tone jump determination unit, and correction processing by the correction unit, with each of a plurality of horizontal input pixels arranged in a horizontal direction included in a video signal input to the image processing device, as the pixel of interest, and
carries out determination by the determination unit, determination by the tone jump determination unit, and correction processing by the correction unit, with each of a plurality of vertical input pixels arranged in a vertical direction included in the video signal as the pixel of interest.

7. The image processing device according to claim 1, wherein the correction unit smooths the tone jump in order to correct the tone jump.

8. The image processing device according to claim 1, wherein the first threshold is less than the reference value.

9. The image processing device according to claim 1, wherein the first pixel group includes the pixel of interest and does not include the second adjacent pixel, and the second pixel group includes the pixel of interest and does not include the first adjacent pixel.

10. The image processing device according to claim 1, wherein the first pixel group includes neither the pixel of interest nor the second adjacent pixel, and the second pixel group includes neither the pixel of interest nor the first adjacent pixel.

11. The image processing device according to claim 1, wherein the first pixel group includes the pixel of interest and does not include the second adjacent pixel, and the second pixel group includes neither the pixel of interest nor the first adjacent pixel.

12. The image processing device according to claim 1, wherein the first pixel group includes neither the pixel of interest nor the second adjacent pixel, and the second pixel group includes the pixel of interest and does not include the first adjacent pixel.

13. An image processing method comprising:

determining whether or not, among a plurality of pixels arranged linearly including a pixel of interest, a first adjacent pixel adjacent to the pixel of interest, and a second adjacent pixel adjacent to the pixel of interest and opposite to the first adjacent pixel, there is a pixel having a pixel value whose difference from a pixel value of the pixel of interest is greater than or equal to a reference value;

when it is determined that there is no pixel having a pixel value whose difference from the pixel value of the pixel of interest is greater than or equal to the reference value, determining whether or not a difference between (i) an average value of pixel values of a first pixel group including the first adjacent pixel among the plurality of pixels and (ii) an average value of pixel values of a second pixel group including the second adjacent pixel among the plurality of pixels is less than or equal to a first threshold; and when it is determined that the difference between (i) the average value of pixel values of the first pixel group and (ii) the average value of pixel values of the second pixel group is less than or equal to the first threshold, correcting a tone jump of at least one pixel among the plurality of pixels.

14. A non-transitory computer readable medium storing a program for causing a computer to execute the image processing method according to claim 13.

* * * * *